United States Patent [19]

Escudero et al.

[11] 4,307,120

[45] Dec. 22, 1981

[54] COCONUT METHOD AND PRODUCT

[76] Inventors: Conrado A. Escudero, 638 Washington St., New York, N.Y. 10014; Carl P. Schaffner, 10 Young's Pl., Trenton, N.J. 08619

[21] Appl. No.: 97,411

[22] Filed: Nov. 26, 1979

Related U.S. Application Data

[63] Continuation-in-part of Ser. No. 972,663, Dec. 26, 1978, abandoned.

[51] Int. Cl.$^3$ .......................... A23L 1/36; A23L 1/272
[52] U.S. Cl. ..................................... 426/241; 426/617; 426/326; 426/335; 426/539; 426/242
[58] Field of Search ............... 426/615, 241, 336, 242, 426/335, 617, 539

[56] References Cited

U.S. PATENT DOCUMENTS

| | | | |
|---|---|---|---|
| 2,783,152 | 2/1957 | Maya et al. ......................... | 426/617 |
| 2,973,272 | 2/1961 | Winston ............................. | 426/617 |
| 3,494,724 | 2/1970 | Gray ..................................... | 21/54 |

OTHER PUBLICATIONS

Latimer et al., Journal of Clinical Microbiology, Oct. 1977, vol. 6, #4, pp. 340–342.
Schaffner et al., Applied Microbiology, May 1967, vol. 15 #3, pp. 471-475.
Publication Reprint, Food Eng., Sep. 1978, "Microwave Drying: What's Holding It Back?".
Publication Reprint, Oct. 1975, Canner/Packer "Microwave Drying of Onions Produces Lower Microbial Counts".
Ponting and Johnson, "Determination of Sulfur Dioxide in Fruits", Ind. Eng. Chem., pp. 682, 686, 1945.
Allen, R. R., "Volatile Flavour Constitutients in Cocoanut Oil", Chem. Ind. (London), p. 36, 1960.

*Primary Examiner*—Jeanette M. Hunter
*Attorney, Agent, or Firm*—Flehr, Hohbach, Test, Albritton & Herbert

[57] ABSTRACT

A method of preparing dried coconut meat which retains its white appearance during extended storage while having increased flavor and odor imparting constituents by contacting raw moist coconut with a sulfur dioxide solution followed by microwave electromagnetic irradiation.

14 Claims, 7 Drawing Figures

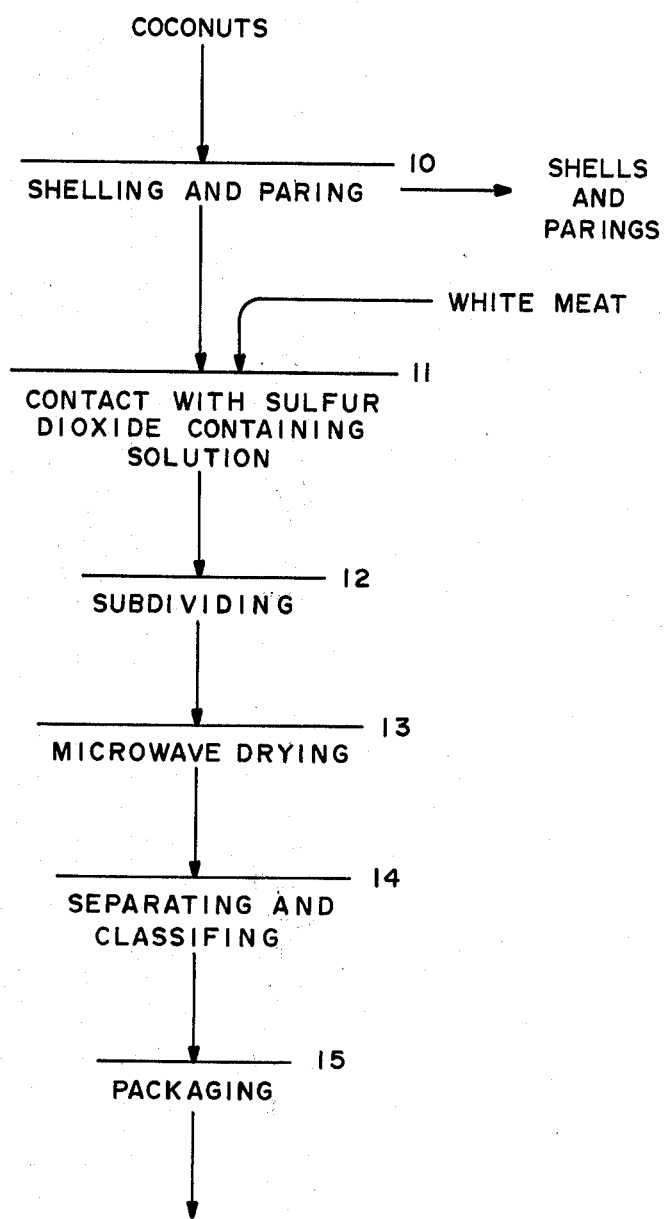
FIG.—1

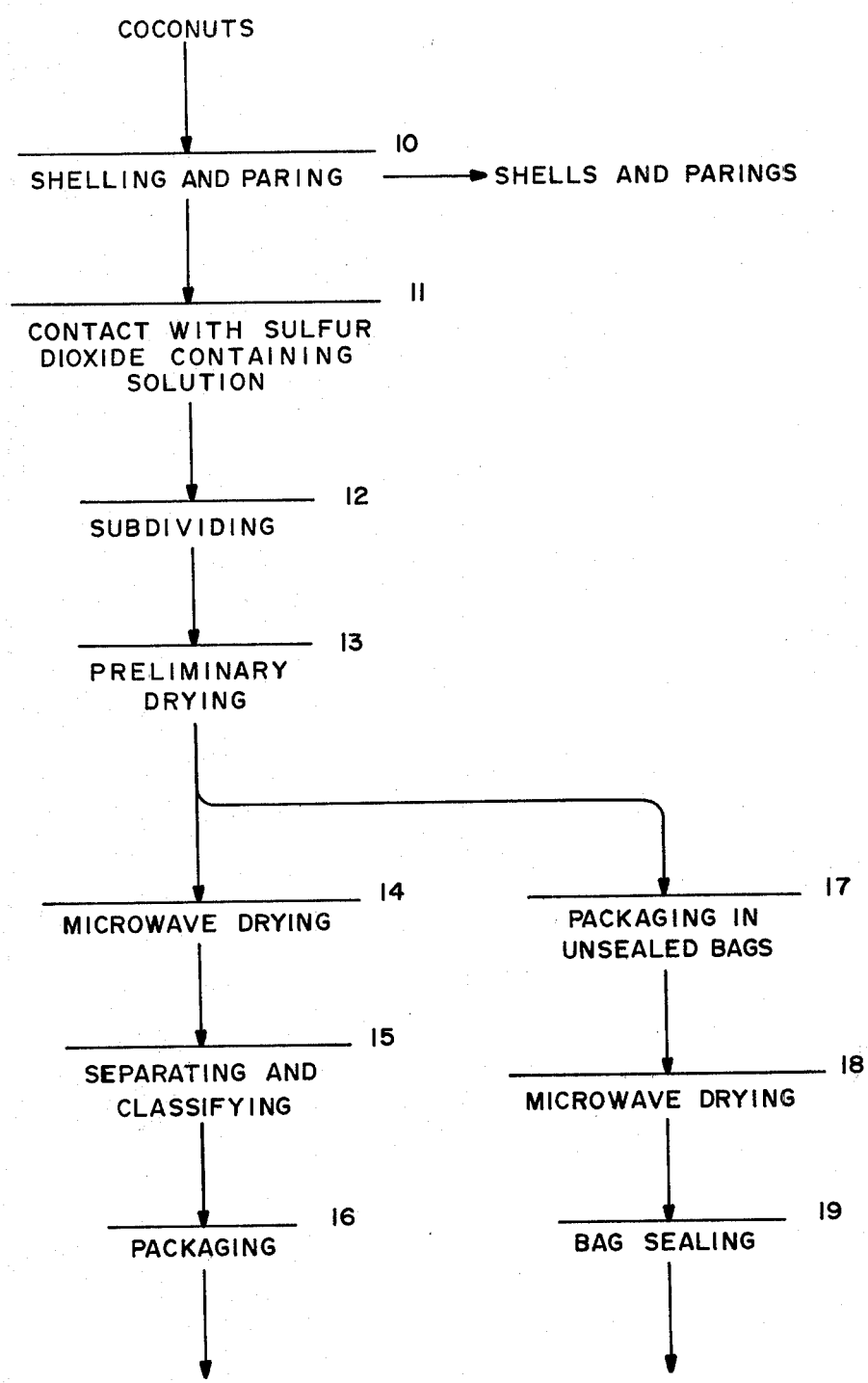
FIG.—2

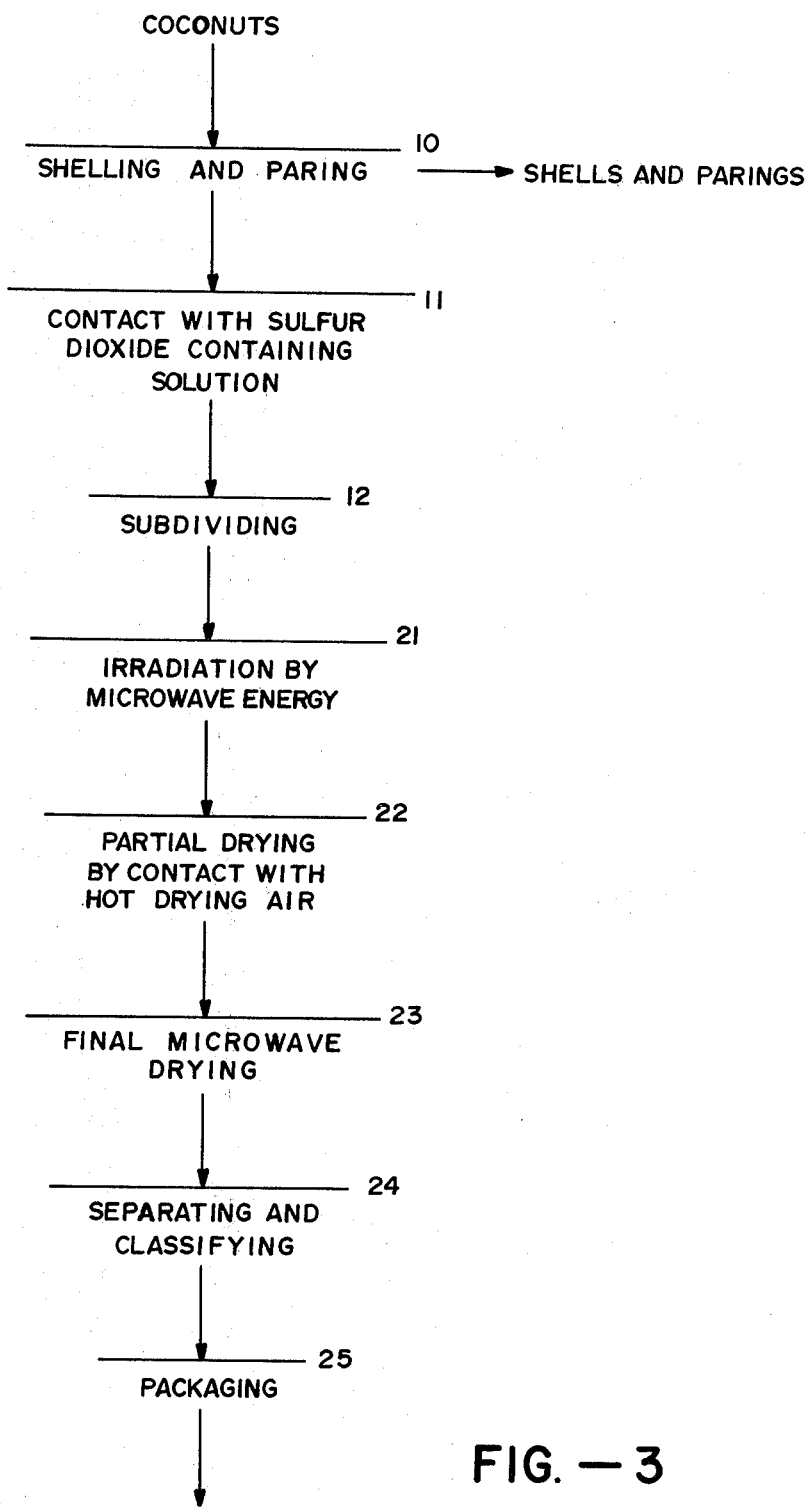
FIG. —3

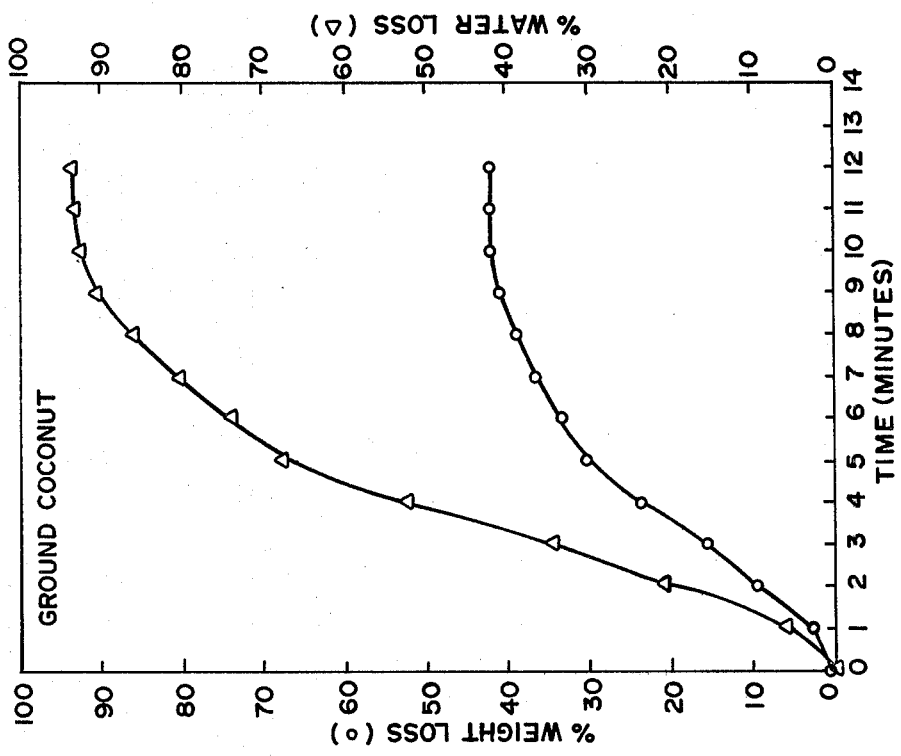
FIG.—5
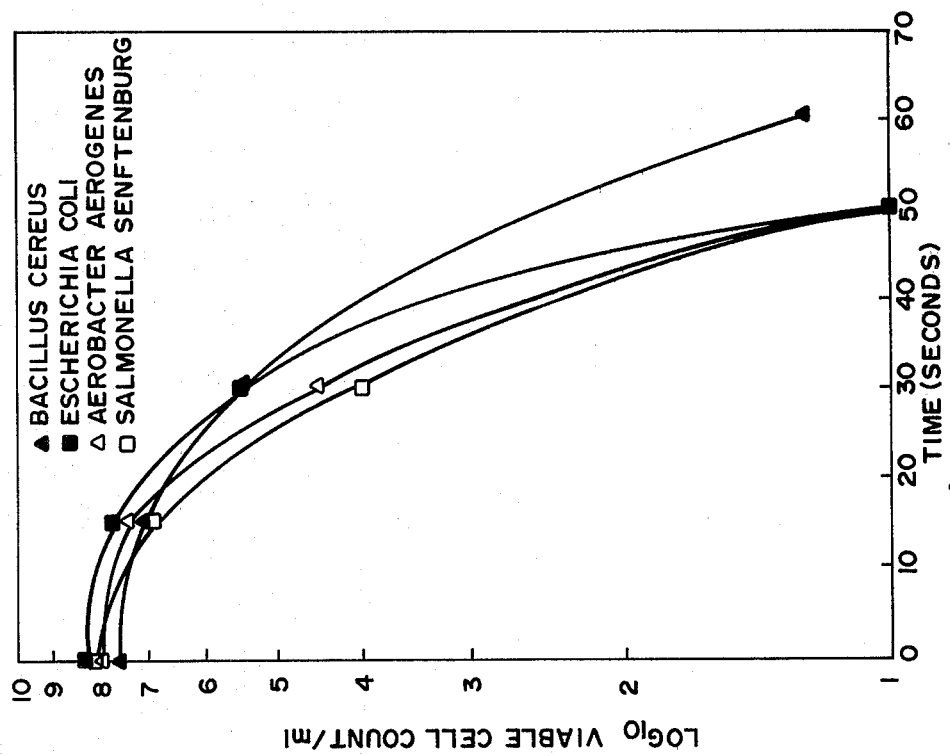
FIG.—4

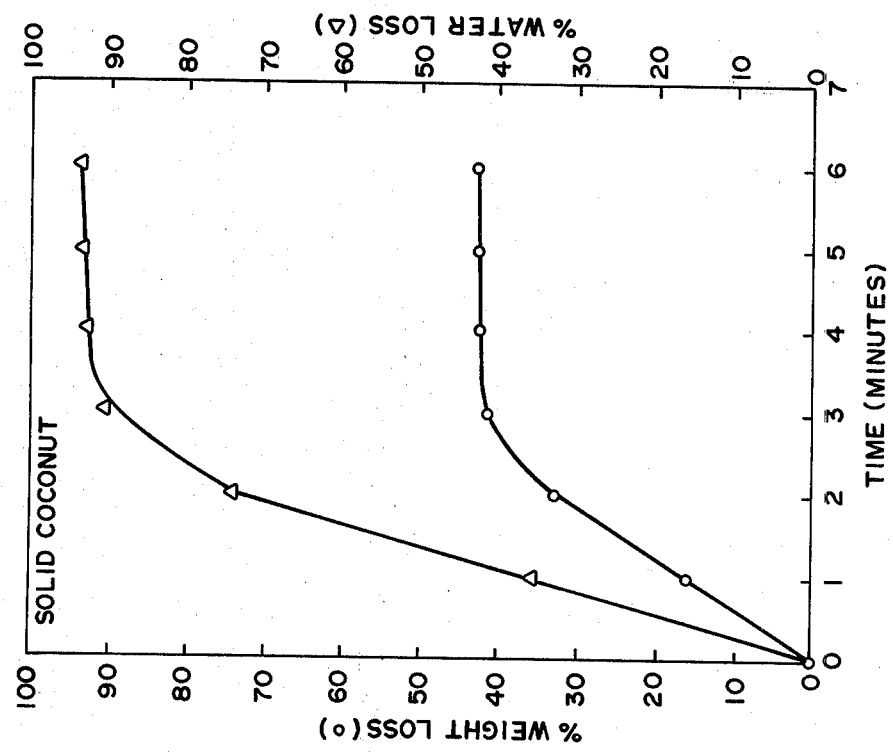
FIG.—7
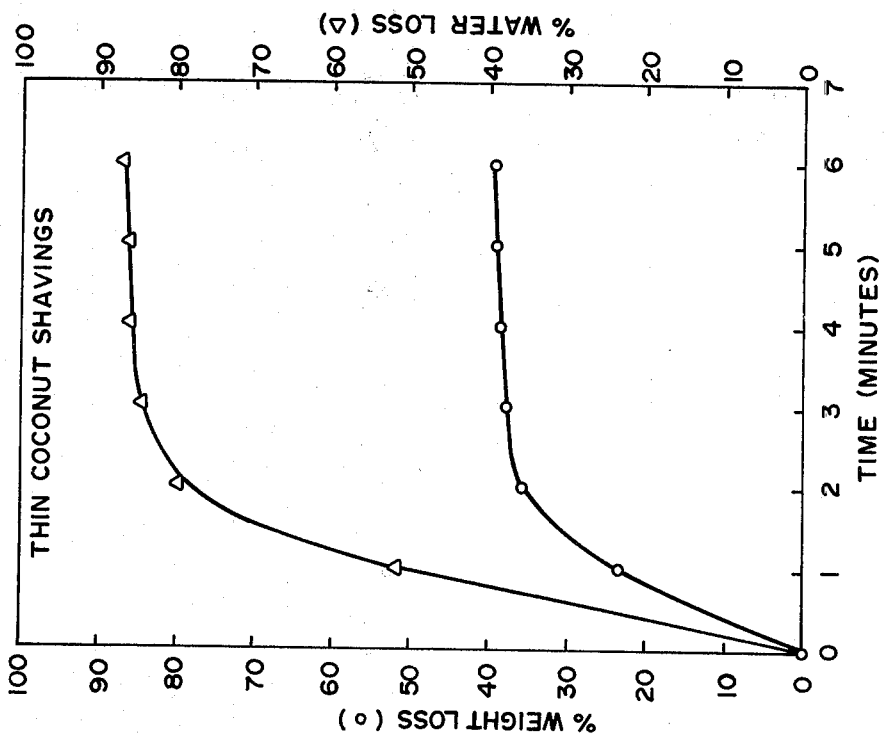
FIG.—6

COCONUT METHOD AND PRODUCT

This application is a continuation-in-part of our co-pending application Ser. No. 972,663 filed Dec. 26, 1978 now abandoned.

This invention relates generally to methods for microbial decontamination of coconut and to novel coconut products.

Raw coconut is presently processed to produce copra used in the manufacture of coconut oil and desiccated coconut which is an edible product used extensively in the food industry. The processing of raw coconut for manufacture of copra and desiccated coconut employs drying methods that have been used in the coconut industry for many years. For copra, the raw meat is subjected to sun drying or drying in a hand operated coconut shell-fired oven. Little concern is given to the discoloration or microbial contamination of the product. In recent times, the detection of significant levels of he carcinogenic mycotoxins, namely the aflatoxins in copra and copra meal due to microbial growth, has been of grave concern to health authorities.

In the manufacture of desiccated coconut as an edible food product, greater care is given to the possibility that microbial contamination will make the product unsuitable for human consumption. The presence of salmonellae in desiccated coconut has been linked to human salmonellosis and extensive studies in 1962 have revealed that raw unprocessed coconut supports the growth of salmonellae as well as that of other enteric bacteria. Whereas the microbial infection of the intact growing coconut has been proved to be either nonexistent or negligible, except when mechanical injury to the nut exposes meat or milk to infection, the possibility of microbial contamination in ripe harvested nuts is increased significantly. Coconut meat or milk serves as an ideal nutrient medium for the rapid growth of optimum levels of enteric bacteria. Harvested coconut employed in the manufacture of desiccated coconut invariably exhibits significant and potentially dangerous levels of microbial contaminations, including those of the salmonellae and *Escherichia coli* most often associated with fecal contaminations.

The resistance of salmonellae and other enteric bacteria to conventional desiccation during the manufacture of desiccated coconut results in detectable residual levels of bacterial contamination in the finished product, making it unfit for human consumption. The first significant attempt at microbial decontamination in the manufacture of desiccated coconut was the introduction of pasteurization as reported in 1967 (C. P. Schaffner, et al. *Appln. Microbiol.*, 15, 471-475). While it has been known that drying over a period of 30-40 minutes at temperatures between 90°-110° C. destroys a great proportion of the bacterial population in wet ground coconut, the numbers of bacteria surviving in the desiccated product is directly related to the extent of contamination in the raw product. The inefficiency of decontamination during drying is undoubtedly due to the use of dry heat. It is well recognized that moist heat is more efficient for the destruction fo bacteria and other microorganisms than dry heat, and for this reason, pasteurization of wet coconut has provided to be a partial solution for the decontamination of coconut. Other decontamination procedures have been tried but have proven to be unsuitable for various reasons. Roasting processes have achieved sterilization but they result in highly discolored coconut products. Ethylene oxide sterilization, although highly efficient, has alarmed health authorities for fear of residual levels of the toxic ethylene oxide or its degradation products. Sterilization by radiation from gamma rays of spent atomic fuels, such as cobalt 60, or electron sources from accelerators have all proved to be too impractical for the commercial production of coconut products in large quantities.

In the currently used process of manufacturing desiccated coconut as an edible food product, whole coconuts, often fully contaminated with bacteria and other microorganisms, are shelled and then pared to remove the inner brown skin. The parings are separately dried to produce a material from which paring oil is manufactured. The exposed white coconut meat after washing is treated with sulfur dioxide bearing solutions and is pasteurized in hot water tanks prior to grinding. In modern desiccated coconut plants conveyor type hot air dryers such as the Proctor & Schwartz ovens are employed to dry the wet ground coconut meat. Immediately before drying the material is also subjected to steam blanching to effect some additional microbial decontamination. The drying cycle takes place in 30 to 40 minutes with dry air temperatures as high as 100° C. or higher. The drying process is very inefficient due to the loss of considerable heat energy in the form of moisture laden exhaust air and heated environment. The desiccated product is also frequently scorched due to overheating, resulting in bits of highly discolored coconut in the finished product. Wet ground coconut as supplied to the dryer contains about 50% water, whereas the desiccated coconut after drying contains 3-4% moisture. During the first phase of the drying cycle, when the moisture content is relatively high, clumping tends to occur whereby moist balls or clumps are formed which resist drying, with the possibility of increased contamination with bacteria and fungi, resulting respectively in rancid and moldy coconut. In spite of these apparent difficulties in such coconut drying, most of the desiccated coconut in world trade today is prepared in this manner. The desiccated coconut of modern commerce still exhibits varying but significant contamination with bacteria and fungi.

Unlike what is involved in the production of copra for the preparation of coconut oil, the desiccated coconut industry has also been concerned with the yellowing of coconut during processing or during storage. This yellowing is due to the well-known "browning reaction" in the food industry. This reaction in food products may be enzymatic or non-enzymatic by nature. In the yellowing or discoloration of desiccated coconut, the reaction appears to be non-enzymatic by nature, and involves the interaction of the free carbonyl group of carbohydrates with the amino groups of amino acids, proteins and/or amines. During the processing of desiccated coconut, the maturity of the nuts employed appears to be one of the factors in yellowing, perhaps reflecting differences in the content of reducing sugars. Excessive heating enhances the "browning reaction" resulting in yellow or discolored coconut. The shelf life of desiccated coconut is thus dependent upon the temperature during storage. During processing, raw wet coconut when untreated to prevent yellowing will usually begin to yellow in one to three months after preparation of the finished desiccated product.

In the past it has been found posssible to increase the shelf life of desiccated coconut without substantial yellowing by prior treatment of the wet coconut with sulfur dioxide (SO₂) bearing chemical solutions. We can refer to U.S. Pat. No. 2,973,272 by A. A. Winston and D. J. Kelley, dated Feb. 28, 1961, describing the calcium metabisulfite treatment of coconut meat and in particular, treatment of the inner surface of the nut endosperm. The resulting desiccated coconut product which is now somewhat protected from yellowing has a residual free sulfur dioxide content not greater than about 500 p.p.m. and a calcium content of at least about 150 p.p.m. Desiccated coconut with a residual $SO_2$ content in excess of 250 p.p.m. is considered unacceptable because of off-flavor. Products for human consumption preferably have a free $SO_2$ content well below 100 p.p.m. (e.g., 40–50 p.p.m.). To carry out treatment according to U.S. Pat. No. 2,973,272, pared wet coconut meat is immersed in an aqueous solution containing calcium chloride and sodium metabisulfite which in turn produces calcium metabisulfite. The concentration of the $SO_2$ containing chemical such as calcium metabisulfite in the aqueous solution and the time of exposure of the coconut meat in the solution tend to regulate the degree of protection the desiccated coconut product will exhibit against yellowing. The shorter the exposure time of the wet coconut in the treatment solution, the greater the need for more concentrated $SO_2$ bearing solutions. Washing of $SO_2$ treated coconut meat prior to drying results in the removal of free $SO_2$ residues but does not appear to affect protection from yellowing. Depending upon the amount of bound $SO_2$ present, prior art treatment of the wet meat with calcium metabisulfite as the sulfur dioxide bearing chemical extends the storage life of conventional desiccated coconut product without yellowing, which is desirable in a commercial practice. Accelerated storage tests of such products produces yellowing during storage for two to three months, from which it may be concluded that yellowing will occur for extended storage periods such as more than eighteen months.

Even when procedures are used as described above, desiccated coconut product of commerce today occasionally still contains microbial contaminants including among the enteric bacteria the highly undesirable salmonellae and a wide variety of yeasts and fungi. Pasteurization, steam blanching and oven desiccation processes, although greatly reducing the viable microbial content of the coconut, do not produce a product that is sterile.

Microwave decontamination of certain food products other than coconut has been well documented. The pasteurization of milk, destruction of salmonellae on poultry, and the sterilization of food pouches by microwave irradiation are typical examples. Extensive studies have shown that heat generated by microwave irradiation is responsible for the killing of viable microorganisms. Microwave oven irradiation has also been proposed as a method for bacterial decontamination in clinical microbiology laboratories. In a study by J. M. Latimer and J. M. Matsen, *J. Clin. Microbiol.* 6 340–342 (1977) exposure of ten frequently isolated clinical pathogens to microwave irradiation resulted in total sterilization within 60 seconds. The time of irradiation of the highly resistant spores of *Bacillus stearothermophilus* required to ensure sterility in lightly contaminated specimens approached five minutes.

Aside from the matter of bacterial contamination, improved technique is neeeded for the prevention of yellowing during processing and storage, whereby the desiccated product retains its snow white color over longer periods of storage.

It is an object of the present invention to provide a method for treating coconut which will provide dry coconut products free of dangerous and undesirable enteric bacteria, such as the salmonellae and the fecal bacterium *Escherichia coli.*

Another object is to provide a method which provides edible desiccated products suitable for the food industry which are free of such bacterial contamination and which are not subject to yellowing over long storage periods at ambient temperature.

Another object is to provide an improved desiccated coconut product which has a flavor and odor superior to conventional products, as well as being resistant to yellowing and free of bacterial contamination.

Another object is to provide a method which simplifies the production of edible desiccated coconut, and in which bacterial decontamination and drying of the product is carried out by the use of relatively simple compact equipment which has high thermal efficiency and which minimizes the possibility of recontamination.

In general, according to the present method for the manufacture of edible desiccated coconut, pieces or fragments of raw coconut meat are immersed in a sulfur dioxide containing water solution, after which the fragments are subdivided and the subdivided material treated to effect drying to a moistuure content of the order of 2 to 4%, and to effect bacterial decontamination by subjecting the material to microwave irradiation. Treatment with sulfur dioxide containing solution serves to prevent yellowing during drying, and also ensures the production of a high quality white product which is not subject to yellowing over long storage periods at ambient temperature, and which has enhanced flavor.

Referring to the drawing:

FIG. 1 is a flowsheet illustrating one procedure for carrying out the invention.

FIG. 2 is a flowsheet illustrating another procedure for carrying out the invention.

FIG. 3 is a flowsheet showing another procedure for carrying out the invention.

FIG. 4 contains graphs plotted as a result of laboratory work and demonstrate the effectiveness with which various microorganisms which contaminate coconut are destroyed by microwave drying.

FIGS. 5, 6 and 7 are graphs showing the effectiveness and times required for drying by use of a microwave oven, the materials being treated being respectively ground coconut, thin coconut shavings and coconut in the form of solid pieces of substantial size.

In our initial tests to decontaminate desiccated coconut exhibiting total bacterial plate counts of 15,5000 microorganisms per gram, it was found that exposure to high frequency microwave energy of 2450 MHz for 60 seconds resulted in a material exhibiting total bacterial plate counts of 50 or less. We also found that raw wet coconut contaminated with *Salmonella senftenberg* at a level of $1.5 \times 10^6$ viable cells per gram, when exposed to microwave irradiation of the same frequency for 60 seconds, with sufficient energy input to heat the coconut to about 100° C., resulted in total decontamination. We further found that microwave irradiation of larger cuts of coconut served to promote the browning reaction, resulting in discolored and yellowed coconut. This phenomenon was particularly more evident with wet coconut than with desiccated coconut. We also noted that microwave treatment of the finer cuts of desiccated coconut did not produce any major browning or yellowing. Thus treatment of wet finely ground coconut cuts revealed some yellowing which was not experienced in the treatment of the same cut of desiccated coconut. The discoloration of coconut due to the browning reaction is certainly the result of the interaction between carbonyl and amino groups. This is shown by the inhibition of discoloration with pretreatment of coconut employing $SO_2$ bearing chemicals that are known to interact with free carbonyl groups as found in reducing sugars.

We found that either before or after grinding, pretreatment of wet raw coconut by immersion, spraying, swabbing or tumbling with an aqueous solution containing either sulfur dioxide, sulfurous acid, or calcium and sodium metabisulfite, bisulfite, or other sulfite salts followed by microwave irradiation and drying produced a white desiccated coconut of excellent shelf life and flavor and fit for human consumption. Such a product is virtually free of all contaminating microorganisms and totally free of enteric bacteria including the Salmonellae and *Escherichia coli*. The browning reactions seen with microwave irradiation of wet coconut meat which has not been treated with $SO_2$ bearing chemicals was totally inhibited. As is well known, microwave energy is electromagnetic wave energy of a wavelength falling in the microwave region of the electromagnetic spectrum. The Federal Communication Commission in the United States has presently set aside for microwave processing bands of microwave energy within the approximate range between 400 and 20,000 megacycles per second with a wavelength ranging from about 13 inches for the lower frequencies to about 0.7 inch for the high frequencies. Especially, frequencies of about 890–940 megacycles per second with a wavelength of about 13 inches, frequencies of about 2300–2500 megacycles per second with a wavelength of about 4 to 5 inches, and frequencies of 17,850–18,000 megacycles per second with a wavelength of about 0.7 inch are available for microwave processing.

Microwave energy is generated by a suitable high frequency source, such as a magnetron. The generation and use of microwave energy by itself is well known since microwave irradiation has been used for many years in cooking of food. The relationship of microwave frequency, wavelength and microwave velocity is given by the equation:

$$\lambda = Ve/f$$

where $Ve$ = microwave velocity, $f$ = microwave frequency, and $\lambda$ = wavelength.

Referring to FIG. 1 of the drawing, according to our method for producing edible desiccated coconut, the harvested coconuts are first shelled and the white meat pared in step 10 in accordance with conventional methods. The white meat, which may be pieces about 1 inch square, is then immersed in step 11 in a sulfur dioxide containing water solution. In some instances step 11 may be preceded by washing with water, or the solution itself can be used for this purpose. We have obtained good results by using a sulfur dioxide containing solution as disclosed in Winston et al. U.S. Pat. No. 2,973,272. For example, the calcium content of the solution (expressed as calcium chloride) may be about 1–2%, preferably 2%, and the weight ratio of calcium to metabisulfite may be 1.5:1 to 2.0:1 and preferably about 1.75:1. Assuming that the method is being carried out in a continuous fashion, the desired concentration can be maintained by continual introduction of calcium chloride and sulfur dioxide. The coconut is retained in this solution for a period of the order of ½–5 minutes.

Following treatment in the bisulfite solution, the pieces are subjected to subdividing 12 to produce pieces of the size desired in the final product. Subdividing in step 12 can be carried out by equipment of the type presently being used in the coconut industry. It may produce any one of the prevailing commercial forms such as flakes, chips, shreds or granules produced by grinding. After subdividing the coconut meat is substantially saturated with moisture, the moisture content being of the order of 50 to 60%.

In the embodiment of FIG. 1, the next step 13 may be described as microwave drying, in that in this embodiment complete drying is carried out by electromagnetic energy of microwave frequency. Commercial microwave ovens are suitable for this purpose. We have reference to commercial ovens provided with a conveyer which moves material continuously through a succession of energy fields maintained by microwave generators. There is an external housing and shielding to confine the fields. Generally the entrance and discharge ends of the housing are connected with ventilating means which introduces air into the exit end and discharges moist air from the entrance end. The frequency of the microwave energy may be any one of the frequencies previously mentioned which are permitted by government regulations. Assuming that the coconut has been ground to form a wet granular mass, it is deposited upon the conveyor at the entrance end as a layer of uniform depth and width, the thickness of the layer depending somewhat upon the energy input. In general, for complete drying it is desirable that the energy input for a given drying capacity be such that the moisture content is reduced to a value of the order of 3% in a short period of time of the order of 5 to 10 minutes. The drying cycle is dependent upon the energy consumption of the microwave generator or generators employed, which determines the input energy to the product. Higher energy input produces a given degree of drying in a shorter time period. During microwave irradiation sterilization temperatures (e.g., 90°–110° C.) are quickly attained and maintained.

In place of an oven provided with a conveyer, the microwave oven may employ a rotating cylinder within which the material is tumbled as it progresses from the feed to the discharge end. Also ventilation of the interior of the oven may be by closed recirculating means, which may include an air filter and means for conditioning the relative humidity.

Following drying in step 13, the material can be subjected to separating and classifying operations 14, and thereafter packaged in step 15.

The method as described above makes possible a high quality white coconut product which is not subject to yellowing or browning when stored for long periods of time, and in addition, it is free of bacterial contamination including particularly salmonella. Likewise it is free of fungus such as may contaminate coconut dried by conventional tunnel dryers over an extended period of time of the order of 40 minutes. This is attributed to the relatively short time required for drying the material, together with the effect of subjecting the material to microwave energy.

It has been determined that a coconut product made by the foregoing method retains its snow white color during storage for long periods of time (e.g., more than 18 months) at ambient temperature and without use of sealed containers. According to our observations, the remarkable results obtained by use of the invention are due at least in part to more efficient interaction of the sulfite with the sugars in coconut when the coconut is subjected to microwave energy, as distinguished from conventional drying methods. This interaction may be catalyzed by mechanical stimulation of molecules occuring during microwave drying. Thus according to our observations, some of the free $SO_2$ present after treatment with $SO_2$ containing solutions becomes bound $SO_2$ thus reducing the ratio of free $SO_2$ to bound $SO_2$. Effective destruction of bacteria is attributed to uniform internal heating of the coconut to a sterilizing temperature level. Also as presently described, the product has a flavor that is superior to conventional desiccated coconut.

The embodiment illustrated in FIG. 2 again involves treatment of the coconut flesh pieces in a sulfur dioxide containing solution in step 11 and subsequent subdividing in step 12. Instead of supplying this wet material directly to a microwave drying over, it is first subjected to preliminary drying 13 which may for example reduce the moisture content to a value of the order of 20 to 30%. Such preliminary drying can be carried out by conventional methods, as by a simplified dryer of the tunnel type in which the material is subjected to hot air or other drying gases. The drying time for this step in typical instances may be of the order of 15 to 20 minutes. Following such preliminary drying the material is subjected to microwave drying as previously described. Because of the fact that the partially dried material has a lower moisture content, the microwave drying 14 may be modified. For example, the drying time for a given energy input may be reduced to, say, 5 minutes, or the equipment may be designed with a fewer number of electromagnetic fields. Another alternative is to utilize such preliminary drying for the purpose of increasing the capacity of a given microwave oven equipment. In any event, the drying conditions in step 14 are such as to inhibit or destroy contaminating organisms. The separating and classifying steps 15 and 16 may follow microwave drying as in FIG. 1.

In the foregoing description it is assumed that the final product is to be packaged according to market requirements. However, as illustrated in FIG. 2, the partially dried material from step 13 can be subjected to packaging 17 in unsealed bags, such as bags made of polyethylene film of the laminated type. These bags are then fed at a uniform rate to the microwave oven for the drying step 18, in which event drying takes place within the bags. Following drying the bags are immediately sealed in step 19, thus eliminating any possibility of contamination after microwave drying. Another procedure is to introduce the completely dried coconut into bags, sealing the bags and then subjecting them to microwave irradiation to effect decontmination.

The embodiment of FIG. 3 makes use of an initial step of irradiation by microwave energy to ensure destruction of contaminating microorganisms, after which the product is dried. Steps 10, 11 and 12 of FIG. 3 are the same as FIGS. 1 and 2. In step 21, the moist material is subjected to preliminary irradiation by microwave energy, the energy input being such as to rapidly elevate the temperature to a value which effects heat sterilization (e.g., 90°–110° C.). The purpose of this step is primarily to effect preliminary sterilization rather than a reduction in moisture content. However, a minor amount of the moisture may be removed by vaporization. Following such preliminary treatment, the material in step 22 is subjected to conventional drying as by contact with hot drying air. This can be carried out substantially like step 13 of FIG. 2. The material leaving step 22 may be at a moisture content of the order of 20 to 30%. In the following step 23 the material is again irradiated with microwave energy to effect destruction of any remaining contaminating microorganisms and to dry the material to a moisture content of the order of 2 to 4%. The material thereafter may be subjected to separating and classifying 24 and packaging 25 like steps 15 and 16 of FIG. 2.

Assuming that the method of FIG. 3 is carried out continuously, the moist material from step 12 may be delivered continuously to a microwave oven which carries out preliminary sterilization step 21, and then proceed immediately into the housing of a conventional dryer for reducing the moisture content by contact of hot drying air. As the material exits from the housing of the hot air dryer, it immediately passes through a second microwave oven for carrying out final drying in step 23.

Preliminary treatment in step 21 of FIG. 3 by microwave irradiation has been found to be advantageous in that it pre-heats the material to a sterilizing temperature level before the material is contacted with hot drying gas, and such heating is carried out internally as distinguished from heat transfer from exterior surfaces of the pieces to the interior. This step effects complete or nearly complete decontamination, thus inhibiting growth of microorganisms during drying in step 22. During the course of drying in step 22, the temperature of the pieces tends to be reduced below sterilization by evaporative cooling. However, in the final step 23 further irradiation by microwave energy serves again to heat the material to a sterilizing temperature level which is maintained until drying of the product is completed. Also step 23 reduces the moisture content to the desired low level without excessive localized heating such as is apt to occur when complete drying is carried out in a hot air dryer.

A further advantage of the method as shown in FIG. 3 is that the preliminary irradiation in step 21 has been found to prevent or minimize formation of clumps or balls of the moist material during the drying step 22. As previously pointed out, the formation of such clumps or balls tends to promote growth of contaminating molds and spores.

The graphs of FIG. 4 were prepared from laboratory tests and serve to demonstrate the effectiveness of microwave irradiation in killing the four listed bacteria, the first two of which are particularly prevalent in coconut. The graphs for each of the bacteria show that over a period of 50 seconds the more prevalent bacteria were killed and in 60 seconds all four bacteria were killed.

The graphs of FIGS. 5, 6 and 7 demonstrate the effectiveness of microwave radiation in drying three physical forms of wet coconut meat, namely, ground, thin shavings and solid chunks, and were plotted from laboratory test results. It will be seen that in each instance the moisture content was rapidly reduced in 10 minutes or less. With greater energy input, the time for attaining a given moisture content would have been reduced.

Reference has been made to the long shelf life of desiccated coconut made possible by our method compared to coconut products that have been processed by conventional hot air drying. Laboratory tests have been conducted to demonstrate that the subject coconut product is superior to conventional desiccated coconut with respect to its ability to withstand long storage periods at ambient temperature without yellowing. Also these tests demonstrated our discovery that this characteristic was attained when the free sulfur dioxide content of the final desiccated product was caused to be within certain limits. In carrying out these tests whole coconut meat from intact coconuts was dipped in a solution containing 2.0% calcium chloride and 0.5% sodium metabisulfite for a period of 5 minutes. At the end of that time, the meat was rinsed with distilled water and ground in a Waring blender to produce twelve 75 gram samples of wet coconut. Six of the samples were dried for 10 minutes in a microwave oven at 2450 MHz at moderate energy output setting, and the remaining six samples were dried in a circulating hot air oven at an air temperature of 180° C. for 40 minutes. The final moisture content of all samples was within the range of 2 to 4%. Initially all samples were white in color and appeared to be similar on superficial examination. The free sulfur dioxide content of each of the samples was then determined by the method of Ponting and Johnson (Determination of Sulfur Dioxide in Fruits, *Ind. Eng. Chem.*, 11, 682–686, 1945). A gravimetric method was employed to determine the moisture content. In carrying out this method, 10 grams of desiccated coconut were dried in a Brabender Moisture Tester for 30 minutes at 120° C. to obtain a moisture content reading in percent by weight. The samples were then stored at 37° C. for an accelerated shelf life (yellowing) test, and they were examined monthly over a period of three months. The annexed Table A summarizes the results.

As will be seen from Table A, the first six samples had a free sulfur dioxide content within the range of 29 to 39 ppm, whereas the six samples that were subjected to conventional hot air drying had free sulfur dioxide contents within the range of 40 to 47 ppm. All of the samples dried by microwave irradiation maintained their white color for two months of accelerated shelf life, and all but two maintained their white color through the third month of storage. In this connection it is assumed that each month of accelerated storage corresponds to about 10 months of storage at ambient temperature. In contrast to the samples that were irradiated by microwave energy, the samples that were dried by contact with hot air were noticeably prone to yellowing. Thus, although all of these samples remained white during the first month of accelerated storage, during the second month three of the samples showed yellowing and during the third month all such samples showed substantial yellowing.

Previous reference has been made to the reduction of the ratio between free and bound $SO_2$. This is desirable because the bound $SO_2$ functions to inhibit yellowing during storage of the final product. Also a low level of free $SO_2$, such as from 25 to 50 ppm, in addition to high levels of certain delta lactones, contribute to better flavor and odor. In general, it is desirable for the ratio between free and bound $SO_2$ to be relatively small and for the free $SO_2$ in the final product to be less than 100 ppm. Washing of the coconut with fresh water, after removal from the $SO_2$ solution may be used to reduce the amount of free $SO_2$ before drying, when the amount of free $SO_2$ is deemed to be excessive or when a relatively low level of free $SO_2$ is desired for the final product (e.g., 25–50 ppm).

With respect to the superior flavor and odor of the desiccated coconut produced by the above described method, the essential coconut flavor of coconut meat and of desiccated coconut is due to certain flavor constituents of the coconut oil. Furthermore, it has been determined that a mixture of delta lactones which is present in the coconut oil are deemed to be responsible for most of the coconut flavor and aroma. Particularly, delta octalactone ($C_8$), and to a somewhat lesser extent, delta hexalactone ($C_6$), appear to be dominant factors in providing the desired flavor and aroma (Allen, R. R.: Volatile Flavour Constituents in Coconut Oil. Chem. Ind. [London] 36 1960 [1965]). Tests have been carried out to determine the amount of delta lactones in desiccated coconut made by our method, in comparison to conventional desiccated coconut. Twelve samples were prepared substantially in accordance with the procedure described above to prepare the first six samples of Table A. As controls, twelve different coconut samples were obtained, including four lots each of macaroon, medium and fine cuts. All of the desiccated coconut samples (5 grams each) were extracted three times with 20 ml. aliquots of ethyl ether. The combined ether extracts were allowed to evaporate under nitrogen to an oil residue which was weighed. Approximately 2.3 to 2.6 grams of coconut oil residue was extracted from each of the samples. The volatile constituents in the coconut oil residues were then isolated by the use of a short path distillation apparatus and method described by Allen, R. R. Prior to distillation under vacuum, 2-octanone was added to each coconut oil sample at a concentration of 100 µg/ml to serve as an internal standard. Octanone was used as a substitute for decanone, since it was more readily available. Each oil residue was then introduced into a semi-micro distillation flask which was heated in an oil bath to 110° C. for 15 minutes, and the distillate collected by a cold finger condenser immersed in dry ice-acetone mixture in a Dewar flask. After warming to room temperature, the distillate was removed and the condenser washed with two aliquots of ethyl ether. The combined distillates plus ether washes were stored under refrigeration in tightly sealed vials until gas liquid chromatographic analyses were completed. The volatile constituents in ethyl ether solution, corresponding to each of the samples, was analyzed in a Model 5831A gas chromatograph (Hewlett-Packard Co.) with dual flame ionization detector. The peak heights were integrated with an automatic integrator utilizing a Model 18850 AGC terminal (Hewlett-Packard). The instrument was equipped with a 15 percent SE-52 column (4 ft×3 mm) operated at 240° C. with nitrogen as the carrier gas. The injection and detector temperatures were maintained at 265° C. The peak areas were measured automatically and converted into weight equivalent per gram desiccated coconut on the basis of the known octanone content. The SE-52 (phenyl, methyl silicone) stationary phase (Supelco) being non-polar, readily resolved the non-polar constituents of the volatile fraction of coconut oil. Positive identification of each peak was not made since reference to the previous reported investigator (Allen, R. R.) was possible. The results are tabulated in the annexed Table B.

With reference to Table B, the assignment of peaks to individual ones of the delta lactones was made on the basis of the major peak being the decalactone ($C_{10}$) as reported in the investigations of R. R. Allen. We attribute the superior flavor and odor of our product compared to the conventional desiccated coconut samples identified in Table B, to the presence of hexalactone and octalactone at the relatively high levels shown in the table. With respect to delta octalactone, this flavor constituent was present in amounts ranging from 13 to 18 μg/gm while the conventional desiccated coconut samples had a substantially lower content ranging from 6-11 μg/gm. Also it is significant that the samples made by our method had a content of hexalactone within the range of 29-34 μg/gm, whereas this flavor ingredient was present in the conventional desiccated coconut samples only to the extent of 15-24 μg/gm. The presence of increased amounts of hexalactone and octalactone compared to desiccated coconut samples is attributed, according to our observations, to the manner in which the coconut is dried and is treated by irradiation by microwave energy. Our method greatly reduces the time period of treatment to produce the final dried product, and this is accomplished without localized heating of the material to temperatures well above 100° C., as in conventional air drying. Both extended drying periods and localized heating are believed to substantially increase loss of volatile flavor components, with reference particularly to the delta lactones.

The energy input and time duration of microwave irradiation for the embodiments of FIGS. 1, 2 3 differ depending upon the extent to which irradiation is used to effect removal of moisture. In general, for a given energy input the embodiment of FIG. 1 requires a longer time of irradiation than the embodiment of FIGS. 2 and 3. The embodiments of FIGS. 2 and 3 require less irradiation time because a substantial amount of moisture is removed by conventional methods. As previously indicated, the embodiment of FIG. 3 may employ irradiation primarily for decontamination, with all or most of moisture removal being carried out by hot air drying. In general, the time for irradiation may range from about 5 to 15 minutes for the described embodiments. The selection of a particular procedure for a commercial plant depends upon such factors as energy costs and the extent to which existing equipment and thermal energy sources are available.

Examples of our invention are as follows:

EXAMPLE 1. LABORATORY TESTS

Four husked coconuts were innoculated respectively with strains of *Salmonella senftenberg, Escherichia coli,* Aerobacteraerogenes, and *Bacillus cereus,* all originally isolated from bacterial contaminated desiccated coconut. After 24 hours of incubation at 37° F. the infected coconut water and meat were removed from the coconuts. The total viable cell plate counts were determined with the coconut water and meat of each infected coconut. Samples of the different coconut waters and meats infected with the respective bacterial contaminants were then subjected to microwave irradiation at 2450 MHz for periods of 15, 30, 50, 60, 75 and 90 seconds. Total viable cell plate counts were redetermined with the different coconut water and meat samples. This produced data for plotting viable cell counts in coconut water versus time of microwave irradiation as shown in FIG. 3. Similar results were obtained by irradiation of the infected coconut meat.

EXAMPLE 2. COMPLETE METHOD

Harvested coconuts are shelled and the meat pared. The resulting white meat is cut into pieces approximately 1 inch square. These pieces are introduced into a water solution containing bisulfite and calcium at an ambient temperature. Calcium is provided by adding calcium chloride, and sulfur dioxide is provided by adding sodium bisulfite. This is substantially as disclosed in U.S. Pat. No. 2,973,272. It provides calcium metabisulfite solution in which the ratio of calcium to metabisulfite is about 1.75:1. The pieces of coconut are treated in the solution for a period of about 1 minute. The pieces are then removed from the solution and subdivided to form granules ranging in size from 1/16 to 1/32 inches in diameter. The resulting granular material has a moisture content of about 50%. This is fed to a microwave dryer of the type manufactured by Cober Electronics Inc. operating at a microwave frequency of 2450 MHz. The dryer is provided with a conveyer for moving material continuously through the microwave energy fields. The moist coconut material is supplied to the conveyer belt as an even layer of about 2 inches thick and about 8 inches in width. The kw capacity of the oven would be such that the coconut is dried to a moisture content of about 4% in about 4 minutes, which suffices to kill all of the contaminating organisms.

EXAMPLE 3. COMPLETE METHOD

This example illustrates the procedure shown in FIG. 3. The coconut meat was prepared and contacted with a sulfur dioxide containing solution as described in Example 2. Upon removal from the solution the pieces are rinsed with wash water, and then subdivided to form granules ranging in size from about 1/16 to 1/32 inch diameter. In a typical instance the granular material has a moisture content of about 50%. This wet material is then fed continuously to a combination microwave hot air dryer. The microwave units are located at the entrance and exit ends of the hot air dryer housing. Both microwave units may be of the type manufactured by Cober Electronics Inc. operating at a microwave frequency of 2450 MHz. The combination dryer is provided with a conveyer for moving material continuously through the microwave energy fields. The moist coconut material is supplied to a conveyer belt as an even layer of about 2 inches thick and about 8 inches in width. The kw capacity of the first oven is such that the coconut is rapidly heated to a temperature level of about 100° C. The total time period within the first microwave unit may be about 1-2 minutes. The moisture content of the material as it leaves the first microwave unit and enters the hot air dryer may be about 40-50%. As the material continues through the hot air dryer, it is contacted with hot air at a temperature of about 110°-140° C., and the moisture content of the material as it exits from the air dryer may be about 20%. As the material passes through the second microwave unit it is rapidly heated to a temperature level of the order of 100° C. within a period of the order of 1 to 2 minutes. The power input to the second microwave unit is such that within a period of time of the order of 5 to 10 minutes the material is dried to a final moisture content of about 2 to 3%.

TABLE A

| Coconut Sample | Percent Moisture | Free SO$_2$ ppm | Accelerated Storage Life (months) | | |
|---|---|---|---|---|---|
| | | | 1 | 2 | 3 |
| Microwave #1A | 2.8 | 31 | white | white | white |
| Microwave #2A | 3.2 | 34 | white | white | yellow |
| Microwave #3A | 2.6 | 32 | white | white | white |
| Microwave #4A | 3.5 | 29 | white | white | white |
| Microwave #5A | 2.9 | 30 | white | white | white |
| Microwave #6A | 3.1 | 39 | white | white | yellow |
| Hot air #1 | 2.5 | 45 | white | yellow | yellow |
| Hot air #2 | 2.8 | 47 | white | white | yellow |
| Hot air #3 | 3.0 | 40 | white | yellow | yellow |
| Hot air #4 | 2.2 | 51 | white | yellow | yellow |
| Hot air #5 | 3.1 | 42 | white | white | yellow |
| Hot air #6 | 2.8 | 45 | white | white | yellow |

TABLE B

Volatile Constituents of Desiccated Coconut

| Coconut Sample | Delta Lactones ($\mu$g/gm) | | | | |
|---|---|---|---|---|---|
| | C$_6$ | C$_8$ | C$_{10}$ | C$_{12}$ | C$_{14}$ |
| Microwave #1 | 15 | 32 | 46 | 31 | 11 |
| Microwave #2 | 17 | 35 | 52 | 34 | 15 |
| Microwave #3 | 14 | 31 | 49 | 30 | 12 |
| Microwave #4 | 13 | 30 | 47 | 29 | 9 |
| Microwave #5 | 17 | 32 | 53 | 23 | 13 |
| Microwave #6 | 18 | 34 | 55 | 30 | 17 |
| Microwave #7 | 16 | 31 | 47 | 22 | 10 |
| Microwave #8 | 13 | 28 | 47 | 24 | 11 |
| Microwave #9 | 18 | 34 | 52 | 31 | 12 |
| Microwave #10 | 16 | 30 | 45 | 28 | 15 |
| Microwave #11 | 15 | 29 | 48 | 30 | 10 |
| Microwave #12 | 16 | 32 | 51 | 29 | 8 |
| Red V Medium #1 | 10 | 24 | 47 | 25 | 11 |
| Red V Medium #2 | 9 | 22 | 42 | 29 | 7 |
| Red V Fine #1 | 8 | 20 | 48 | 27 | 14 |
| Red V Fine #2 | 7 | 19 | 47 | 30 | 11 |
| Red V Macaroon #1 | 10 | 22 | 52 | 29 | 9 |
| Red V Macaroon #2 | 11 | 23 | 46 | 32 | 15 |
| Franklin Baker Macaroon | 10 | 21 | 42 | 34 | 12 |
| Peter Paul Extra Fine | 6 | 18 | 51 | 29 | 9 |
| Peter Paul Medium | 11 | 22 | 43 | 31 | 7 |
| Blue Bar Macaroon | 9 | 23 | 49 | 26 | 11 |
| Blue Bar Extra Fine | 7 | 15 | 45 | 35 | 15 |
| Sunripe Medium | 10 | 22 | 50 | 28 | 13 |

What is claimed is:

1. A method for the production of dried coconut meat that is free of salmonella and other bacterial contamination, comprising treating raw moist coconut meat derived from harvested coconut to effect bacterial decontamination and drying to a moisture content of about 2-4% by weight, bacterial decontamination being effected by subjecting the meat to microwave electromagnetic irradiation, the meat before said treatment being contacted with a sulfur dioxide containing solution.

2. A method as in claim 1 in which said treatment to effect bacterial decontamination and drying includes contact of the meat with drying air.

3. A method as in claim 1 in which microwave irradiation is carried out over a period of the order of 5 to 15 minutes.

4. A method as in claim 1 in which microwave irradiation is carried out to effect both bacterial decontamination and final drying to a moisture content of from 2-4%.

5. A method as in claim 1 in which said treatment includes subjecting the moist material to microwave irradiation at the beginning of the treatment to heat the material to a sterilizing temperature, and thereafter subjecting the material to drying by contact with hot gas before final drying to 2-4% moisture.

6. A dried coconut product characterized in that it is free of salmonella and other bacterial contamination, it is white in appearance without yellowing or browning, and it retains its white appearance during storage, the product being produced by the method of claim 1.

7. An edible desiccated coconut product characterized in that it is free of salmonella and other bacterial contamination, it is white in appearance without yellowing or browning, and it retains its white appearance during storage, the product being produced by the method of claim 4.

8. A method for the production of edible desiccated coconut that is free of salmonella or other bacterial contamination, comprising the steps of contacting pieces of white coconut meat derived from harvested coconut with a sulfur dioxide containing solution, subdividing the pieces to the physical form desired for the final product, and then treating the material to effect bacterial decontamination and drying to a moisture content of 2-4% by weight, bacterial decontamination being effected by subjecting the material to microwave electromagnetic irradiation.

9. A method as in claim 8 in which the subdivided coconut is subjected to microwave electromagnetic irradiation to effect both bacterial decontamination and final drying to a moisture content of 2-4%.

10. A method as in claim 9 in which the moist subdivided coconut is subjected to microwave electromagnetic irradiation to heat the same to a sterilizing temperature, and thereafter the material is dried by contact with hot drying gas before said final drying.

11. An edible desiccated coconut product that is characterized in that it is free of salmonella and other bacterial contamination, it is white in appearance without yellowing or browning, and it retains its white appearance during storage, the product being produced by the method of claim 6.

12. An edible desicate coconut product that is characterized in that it is free of salmonella and other bacterial contamination, it is white in appearance without yellowing or browning, and it retains its white appearance during storage, the product being further characterized in that is contains delta lactones as flavor and odor imparting constituents, the content of delta lactones being of the order of 13 to 18 $\mu$g per gram of hexalactone and 29 to 34 $\mu$g per gram of octalactone, the product being produced by the process of claim 6.

13. An edible dessicated coconut product provided by dessication of natural coconut meat having a natural coconut oil content, the product being characterized in that it is free of salmonella and other bacterial contamination, it is white in appearance without yellowing or browning, and it retains its white appearance during storage, the product being further characterized in that it contains delta lactones as flavor and odor imparting constituents, the content of delta lactones in the product being of the order of 13 to 18 $\mu$mg per gram of octalactone and 29-34 $\mu$g per gram of hexalactone and being derived solely from said natural coconut oil content, said product being produced by the method of claim 1.

14. A product as in claim 13 further characterized in that it has a free SO$_2$ content of the order of 25 to 50 ppm.

* * * * *